United States Patent
Mori et al.

(10) Patent No.: US 12,157,415 B2
(45) Date of Patent: Dec. 3, 2024

(54) MONITORING SYSTEM MONITORING PERIPHERY OF MOBILE OBJECT, METHOD OF CONTROLLING MONITORING SYSTEM, AND STORAGE MEDIUM

(71) Applicant: CANON KABUSHIKI KAISHA, Tokyo (JP)

(72) Inventors: Makiko Mori, Kanagawa (JP); Nobuhiro Oka, Kanagawa (JP); Ryuta Suzuki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 101 days.

(21) Appl. No.: 18/302,331

(22) Filed: Apr. 18, 2023

(65) Prior Publication Data
US 2023/0373396 A1    Nov. 23, 2023

(30) Foreign Application Priority Data
May 17, 2022    (JP) ................................ 2022-080656

(51) Int. Cl.
*G06T 7/70* (2017.01)
*B60R 1/23* (2022.01)

(52) U.S. Cl.
CPC ................. *B60R 1/23* (2022.01); *G06T 7/70* (2017.01); *B60R 2300/107* (2013.01); *B60R 2300/80* (2013.01); *G06T 2207/30252* (2013.01)

(58) Field of Classification Search
CPC ...................................................... G06T 7/70
See application file for complete search history.

(56) References Cited

U.S. PATENT DOCUMENTS

| | | |
|---|---|---|
| 2020/0165799 A1 | 5/2020 | Wu |
| 2021/0087794 A1 | 3/2021 | Yamamoto |
| 2022/0112693 A1 | 4/2022 | Doi |

FOREIGN PATENT DOCUMENTS

| | | |
|---|---|---|
| EP | 2 578 757 B1 | 5/2019 |
| JP | H11-222882 A | 8/1999 |
| JP | 2014-225803 A | 12/2014 |
| JP | 2016-172963 A | 9/2016 |
| JP | 6045865 B2 | 12/2016 |
| JP | 2022-62374 A | 4/2022 |

OTHER PUBLICATIONS

European Search Report issued Oct. 13, 2023 during prosecution of related European Application No. 23168442.4.

*Primary Examiner* — Young Lee
(74) *Attorney, Agent, or Firm* — VENABLE LLP (57) ABSTRACT

A monitoring system that monitors periphery of a shovel moving on ground and reports a tumble risk of the periphery of the shovel to an operator includes: a risk determination unit configured to determine a tumble risk in a case of movement of the shovel to the periphery based on distance information measured by a first sensor that is mounted on the shovel and measures a distance to a ground object including the ground in the periphery of the shovel and slope information measured by a second sensor measuring a slope of the shovel; and a display video generation unit configured to generate and output an image indicating the tumble risk determined by the risk determination unit.

10 Claims, 7 Drawing Sheets

MONITORING SYSTEM MONITORING PERIPHERY OF MOBILE OBJECT, METHOD OF CONTROLLING MONITORING SYSTEM, AND STORAGE MEDIUM

BACKGROUND OF THE INVENTION

Field of the Invention

The present invention relates to a monitoring system that monitors the periphery of a mobile object, a method of controlling the monitoring system, and a recording medium.

Description of the Related Art

Systems that ascertain changes in obstacles or topographies in the peripheries of vehicles by using cameras or distance sensors installed in the vehicles and report the changes to drivers of the vehicles are known. Japanese Patent Application Laid-open No. 2014-225803 discloses a technology for extracting a ground object in the periphery of a working machine by using, as reference, a surface on which the working machine is located in a distance image obtained from a stereo camera with which the working machine is equipped and displaying a situation of the ground object superimposed on the captured image. Japanese Patent Application Laid-open No. H11-222882 discloses a technology for monitoring a danger region where there is an abrupt change in topography, such as a cliff located in the periphery of a construction machine, by using a multiple-lens camera mounted on the construction machine which can travel, and performing control such that the construction machine does not approach the danger region.

In the technology disclosed in Japanese Patent Application Laid-open No. 2014-225803, however, a ground object is extracted using a surface where a construction machine is located as a reference. Therefore, when the surface on which the construction machine is located is not horizontal, it is difficult to accurately extract a ground object in the periphery of a working machine and transfer the extracted ground object to an operator. In the technology disclosed in Japanese Patent Application Laid-open No. H11-222882, although it is possible to correct distance information to reference coordinates and acquire topography information in which the direction of gravity serves as a reference, a risk of a tumble or fall in the case of inroad of a construction machine into a region which has a change in topography cannot be determined in consideration of a slope of the construction machine itself.

SUMMARY OF THE INVENTION

This disclosure provides a monitoring system capable of determining a tumble risk of a mobile object even on a slope with high accuracy.

A monitoring system monitors the periphery of a mobile object moving on the ground and reports a tumble risk of the periphery of the mobile object to an operator. The monitoring system includes: a risk determination unit configured to determine a tumble risk in a case of movement of the mobile object to the periphery based on distance information measured by a first sensor that is mounted on the mobile object and measures a distance to a ground object including the ground in the periphery of the mobile object and slope information measured by a second sensor measuring a slope of the mobile object; and an image generation unit configured to generate and output an image indicating the tumble risk determined by the risk determination unit.

Further features of the present invention will become apparent from the following description of exemplary embodiments with reference to the attached drawings.

DESCRIPTION OF THE EMBODIMENTS

First Embodiment

Figure 1:
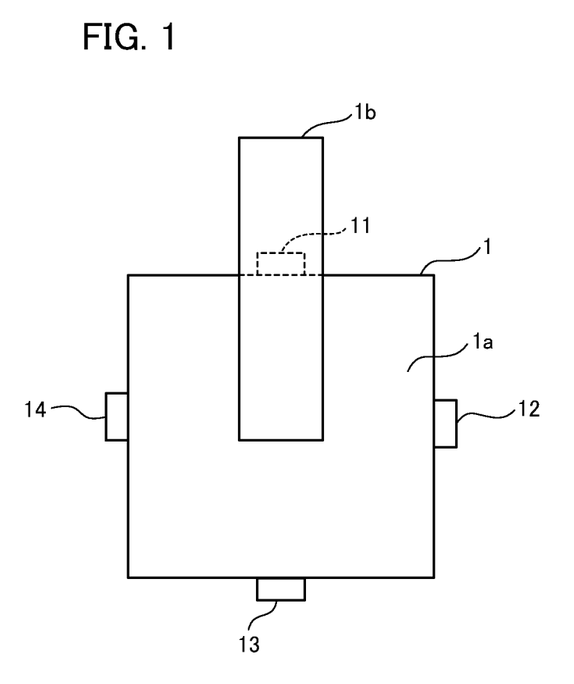
FIG. 1 is a diagram illustrating a positional relation between a mobile object and a camera.

FIG. 1 is a diagram illustrating a positional relation between a mobile object and a camera. A mobile object is a vehicle or a robot such as a passenger car or a bus moving on ground or a working machine. A working machine is, for example, a machine performing work, such as a construction machine performing construction work. In the embodiment, a shovel 1 which is a working machine capable of traveling as a mobile object will be described as an example. The shovel 1 includes a turning unit 1a and an arm 1b. An operator of the shovel 1 can excavate the ground or the like in the periphery of the shovel 1 by turning the turning unit 1a in any direction and then operating the arm 1b. The operator 1 of the shovel 1 may ride the shovel 1 or may perform a remote operation without riding it.

A distance sensor acquiring distance information used in a monitoring system that monitors the periphery of a mobile object is mounted on the shovel 1. The distance sensor is a device that measures a distance to a ground object including the ground in the periphery of the shovel 1, a construction such as a building, an obstacle, or a natural object. In the embodiment, an example in which four cameras, cameras 11 to 14, are installed as the distance sensor in the shovel 1 will be described. The camera 11 is installed on a front side of the shovel 1 (the upper side of the sheet surface of FIG. 1) with the front side of the shovel 1 as an imaging range. The camera 12 is installed on the right side of the shovel 1 with the right side of the shovel 1 as an imaging range. The camera 13 is installed on the rear side of the shovel 1 with the rear side of the shovel 1 as an imaging range. The camera 14 is installed on the left side of the shovel 1 with the left side of the shovel 1 as an imaging range. In the embodiment, the example in which the four cameras are mounted on the shovel 1 will be described, but the number of cameras is not limited to four. One or more cameras may be installed on a mobile object.

Each of the cameras 11 to 14 includes an image sensor that captures an optical image and an imaging optical system that forms an optical image on a light-receiving surface of the image sensor. The imaging optical system included in each of the cameras 11 to 14 includes, for example a fisheye lens or a wide angle lens with which the periphery of the shovel can be widely imaged. The cameras 11 to 14 are installed on the shovel 1 so that the ground in the periphery of the shovel 1 is included in the imaging ranges of the cameras 11 to 14. Therefore, when the shovel 1 is on a horizontal surface, the cameras 11 to 14 are installed on the shovel 1 so that optical axes of the imaging optical systems of the cameras 11 to 14 are oriented downward rather than in a horizontal direction.

Figure 2:
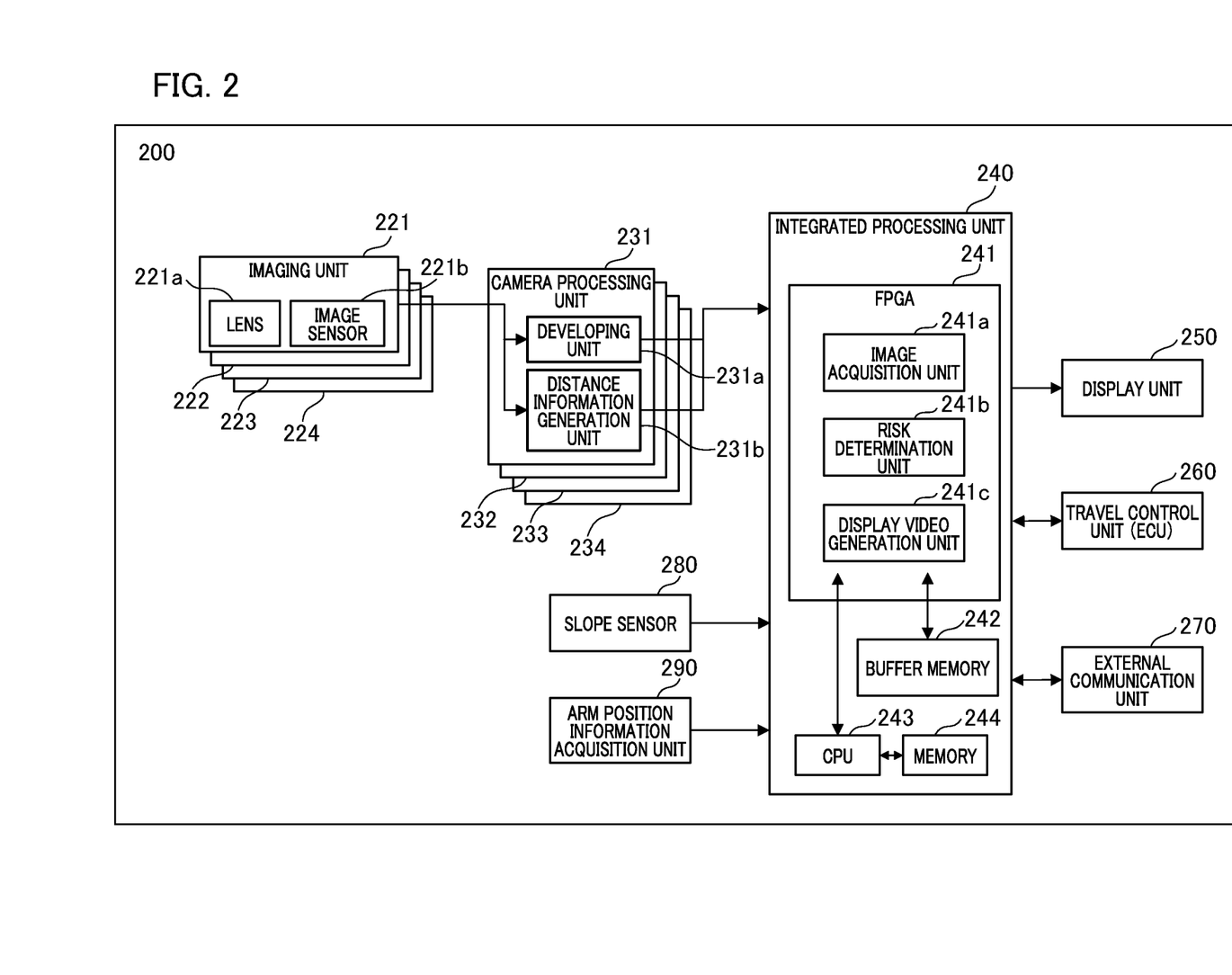
FIG. 2 is a diagram illustrating a configuration of an image processing system.

Next, a configuration of a monitoring system that monitors the periphery of a mobile object according to the embodiment will be described with reference to FIG. 2. FIG. 2 is a diagram illustrating a configuration of the monitoring system. The monitoring system monitors a tumble/fall risk in a case of movement of a mobile object from a present location to the periphery based on an image which is distance information acquired from the camera 11 which is a distance sensor and slope information of a mobile object. A monitoring system 200 may be mounted on the shovel 1 or may be mounted on an information processing device such as a PC or a tablet terminal operated by the operator of the shovel 1. The monitoring system 200 may be implemented on a cloud and only an image of a result may be reported to the operator of the shovel 1. The monitoring system 200 includes the plurality of cameras 11 to 14, an integrated processing unit 240, a slope sensor 280, an arm position information acquisition unit 290, a display unit 250, a travel control unit 260, and an external communication unit 270.

The cameras 11 to 14 include imaging units 221 to 224 and camera processing units 231 to 234, respectively. First, the imaging units 221 to 224 will be described. Since the imaging units 221 to 224 have the same configuration, only the imaging unit 221 will be described here. The imaging unit 221 includes a lens 221a and an image sensor 221b. The lens 221a is included in the imaging optical system of the camera 11 and forms an optical image on a light-receiving surface of the image sensor 221b. The lens 221a is, for example, one or more optical lenses.

The image sensor 221b includes a photoelectric conversion portion (a light-receiving element) and outputs a signal (an analog signal) in accordance with an optical image. The image sensor 221b is, for example, a CMOS image sensor or a CCD image sensor. The image sensor 221b can measure a range in accordance with a so-called imaging surface phase difference. The image sensor 221b includes a plurality of light-receiving elements for one pixel and photoelectrically converts at least a pair of optical images to generate at least a pair of image signals with different viewpoints. In the embodiment, an example in which each of the pixels on the imaging surface includes a pair of light-receiving elements will be described, but some of the pixels may be pixels that include a pair of light-receiving elements or the number of light-receiving elements included in one pixel may be, for example, two or more. In the image sensor 221b, a pair of light-receiving elements generate a pair of image signals corresponding to light fluxes passing through different pupil regions of the imaging optical system. For example, RGB color filters are arrayed for each pixel on the light-receiving surface of the image sensor 221b. The array of the RGB color filters is, for example, a Bayer array. Accordingly, (R, G, R, G) signals are outputs in sequence from, for example, a predetermined row of the image sensor and (G, B, G, B) signals are output in sequence from a neighboring row in accordance with the Bayer array.

Next, the camera processing units 231 to 234 will be described. Since the camera processing units 231 to 234 has the same configuration, only the camera processing unit 231 will be described here. The camera processing unit 231 processes an image signal output from the imaging unit 221. The camera processing unit 231 includes a developing unit 231a and a distance information generation unit 231b. The developing unit 231a performs a developing process on the image signal output from the imaging unit 221. Specifically, the developing unit 231a adds and combines a pair of imaging signals with different viewpoints received from the imaging unit 221 for each pixel to generate one combined image signal. Further, the developing unit 231a converts the generated combined image signal into an image with an RGB raster format of a de-Bayer processing (demosaic processing). Further, the developing unit 231a performs an image correctio process on the image. Examples of the image correction process include white balance adjustment, gain offset adjustment, gamma processing, a color matrix processing, and a lossless compression process. Hereinafter, an image signal developed by the developing unit 231a is referred to as a developer image.

The distance information generation unit 231b generates distance information based on a pair of image signals with different viewpoints received from the image sensor 221b. The distance information generation unit 231b calculates a distance image indicating a distance value of each pixel as distance information from a relative positional deviation amount (a parallax amount) between the pair of image signals using, for example, a known ranging scheme. In this way, the cameras 11 to 14 can acquire the distance information (depth information) from a plurality of pieces of image data with different viewpoints in accordance with an imaging surface phase difference detection method using a pupil division image sensor. The camera processing unit 231 and the imaging unit 221 are integrally configurated so that, for example, an operation of the camera processing unit 231 is performed by a processing unit stacked in the image sensor 221b.

The integrated processing unit 240 includes, for example, one or more processors and controls the entire monitoring system 200 by executing a control program stored in the memory 244. The integrated processing unit 240 includes, for example, a field programmable gate array (FPGA) 241, a CPU 243, a buffer memory 242, and a memory 244 serving as a storage medium. In the embodiment, an example in which processes of the monitoring system 200 are executed by a combination of a plurality of processors or the like, for example, some of the processes are implemented by the FPGA 241 or the like and the other processes are executed by the CPU 243 or the like will be described, but the present invention is not limited thereto. For example, the FPGA 241 and the CPU 243 may be integrated in a system on chip (SoC). The integrated processing unit 240 according to the embodiment is accommodated in a casing different from that of the cameras 11 to 14.

The field programmable gate array (FPGA) 241 is a processing circuit programmed to perform a predetermined process. A dedicated processing circuit is automatically generated and executed on the FPGA 241 by using a predetermined compiler and a program corresponding to a predetermined process. The FPGA 241 includes an image acquisition unit 241a which is a unit receiving a developer image and a distance image output from each of the camera processing units 231 to 234, a risk determination unit 241b, and a display video generation unit 241c.

The image acquisition unit 241a acquires a developer image and distance information (distance image) from each of the camera processing units 231 to 234. The image acquisition unit 241a outputs the acquired developer image and distance information to the risk determination unit 241b. The image acquisition unit 241a stores the acquired developer image and distance information in the buffer memory 242. The risk determination unit 241b determines a tumble risk when the shovel 1 makes an inroad into regions imaged by the cameras 11 to 14 based on slope information acquired from the distance information and a slope line 280. Further, the risk determination unit 241b generates a tumble risk map corresponding to the calculated tumble risk and outputs the generated tumble risk map to the display video generation unit 241c. The details of a process of determining a tumble risk will be described below. The display video generation unit 241c acquires the developer image stored in the buffer memory 242 and the tumble risk map generated by the risk determination unit 241b and generates a risk display image (hereinafter referring to as a display image) indicating a risk. The display image is an image (video) of a virtual viewpoint. The display video generation unit 241c displays the generated display image on the display unit 250. The display video generation unit 241c transmits the generated display image to the outside of the shovel 1 via the external communication unit 270.

The CPU 243 controls each unit of the integrated processing unit 240 by executing a computer program stored in the memory 244. The buffer memory 242 is a memory used as a work area of the FPGA 241 and the CPU 243. The memory 244 stores a control program and calculation data of the monitoring system 200. The FPGA 241 and the CPU 243 controls the entire monitoring system 200 by executing a process in accordance with a program stored in the memory 244.

The display unit 250 displays the display image received from the display video generation unit 241c as a display image for only an operator of the shovel 1. The display unit 250 is, for example, a liquid crystal display. The display unit 250 is installed at a position which the operator of the shovel 1 can easily view during an operation, for example, in the periphery of an operation panel near the middle of a driving seat of the shovel 1 in a vehicle width direction in front. The travel control unit (ECU) 260 generally performs driving control, direction control, and the like of the shovel 1. The travel control unit 260 contains a computer or a memory. The travel control unit 260 can output a vehicle control signal which is a signal for controlling the shovel 1 to the integrated processing unit 240. The vehicle control signal output by the travel control unit 260 includes, for example, information regarding a travel (movement state) of the vehicle, such as a travel speed, a travel direction, a shift lever, a shift gear, a state of a direction indicator, and a direction of a vehicle by a geomagnetic sensor or the like.

The external communication unit 270 transmits the display image indicating the risk and received from the display video generation unit 241c to the outside. The external communication unit 270 can communicate with the outside through, for example, wireless communication. A destination to which the external communication unit 270 transmits the display image indicating a risk is, for example, a remote control room of the shovel 1. An operator in the remote control room can perform remote control on the shovel 1 while watching the display image with a virtual viewpoint transmitted from the shovel 1. An instruction for the remote control (remote control information) by the operator in the remote control room is transmitted to the shovel through wireless communication, is processed by the integrated processing unit 240, and is transmitted to the travel control unit 260 as necessary. In the slope line 280, a slope of the shovel 1 is measured using a horizontal surface as a reference to obtain slope information. The arm position information acquisition unit 290 acquires a position of the arm 1b or an operation status such as a stretchable state.

Figure 3:
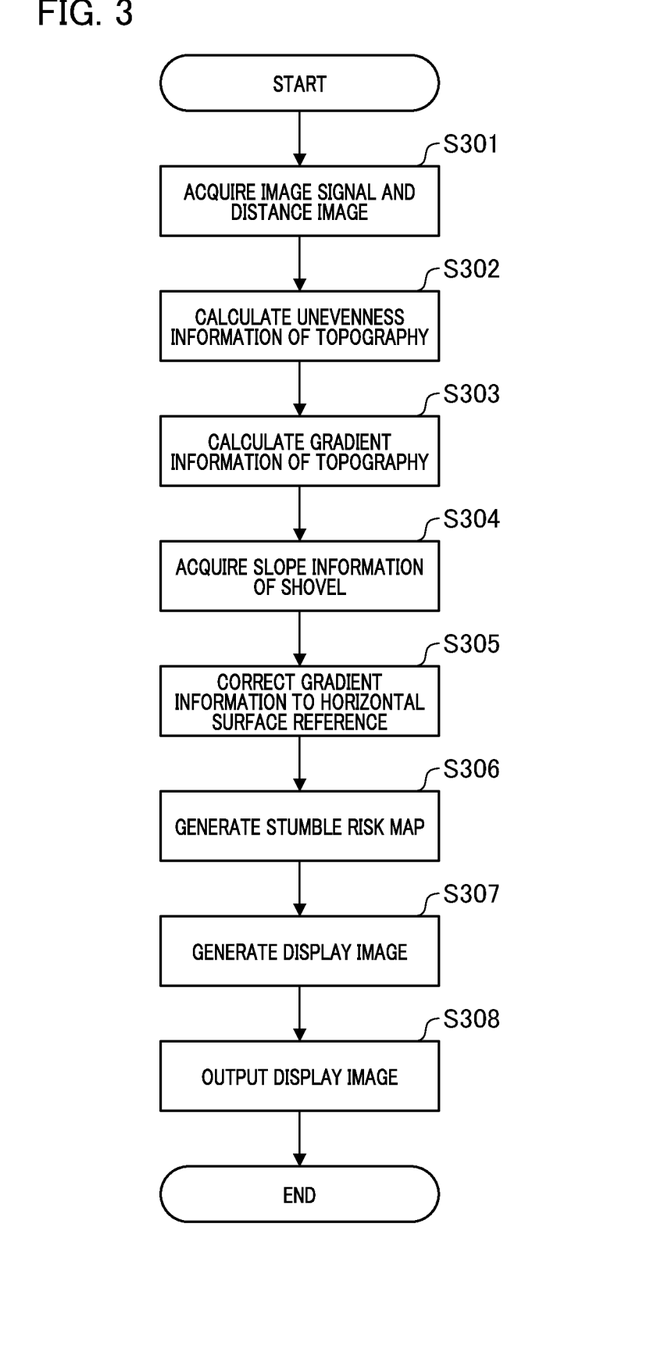
FIG. 3 is a flowchart illustrating a process of determining a tumble risk.

A determination process in which the risk determination unit 241b determines a tumble risk will be described with reference to FIG. 3. FIG. 3 is a flowchart illustrating a process of determining a tumble risk. Each process illustrated in FIG. 3 is performed by the FPGA 241 which is a dedicated circuit generated using a program stored in the memory 244 in the integrated processing unit 240. Each process illustrated in FIG. 3 may be performed by a combination of a plurality of processors, for example, some of the processes may be performed by the FPGA 241 and the other processes may be executed by the CPU 243. The process of determining the tumble risk is started at a timing at which travel of the shovel 1 starts traveling and is executed repeatedly at a period which is N times (where N is an integer of 1 or more) an imaging period of the cameras 11 to 14. The process of determining the tumble risk ends when the shovel 1 is stopped.

In S301, the risk determination unit 241b of the FPGA 241 acquires a distance image (distance information) from each of the cameras 11 to 14 mounted on the shovel 1 via the image acquisition unit 241a. In S302, the risk determination unit 241b of the FPGA 241 calculates unevenness information of a topography in which a grounding surface 400 of the shovel 1 is a reference based on the acquired distance image. In the embodiment, the unevenness information of the topography is information indicating a depth at which the grounding surface 400 of the shovel 1 is a reference for all the pixels of the distance image.

Figure 4A:
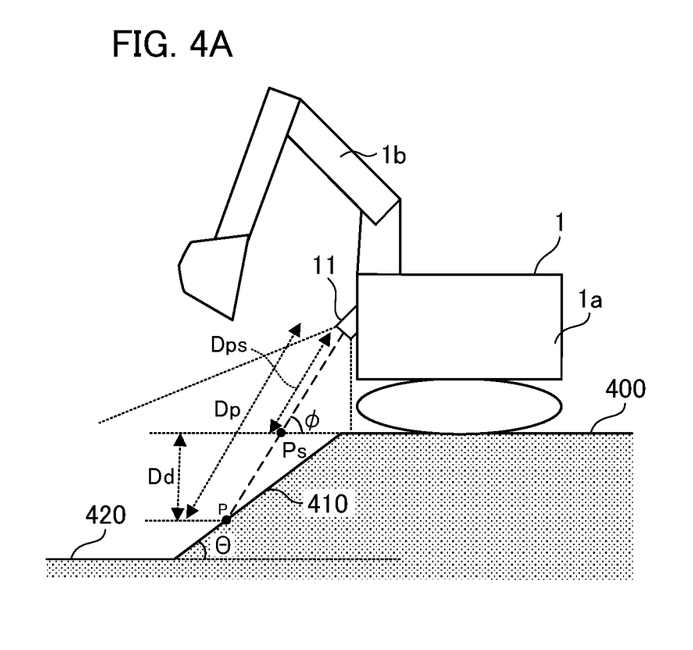
FIGS. 4A and 4B are diagrams illustrating a process of calculating unevenness information of a topography.
Figure 4B:
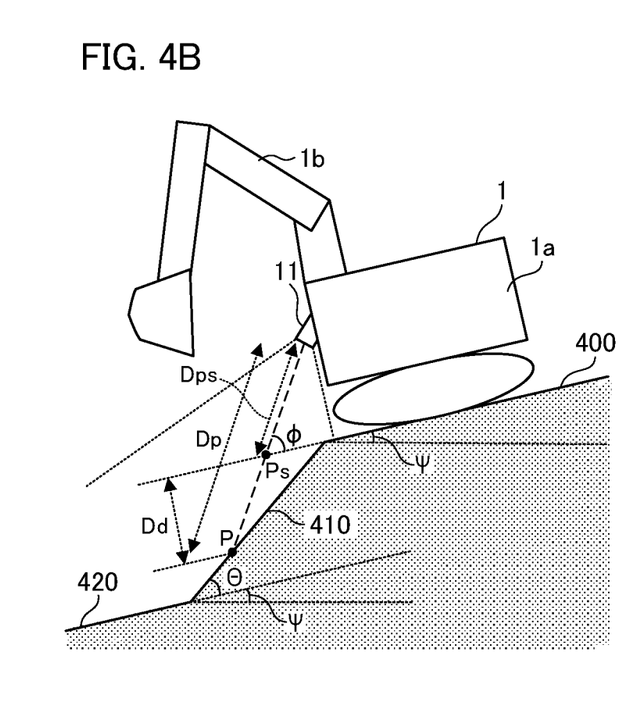

Here, a process of calculating the unevenness information of the topography will be described with reference to FIG. 4A. FIGS. 4A and 4B are diagrams illustrating a process of calculating unevenness information of a topography. In FIG. 4A, the grounding surface 400 of the shovel 1 is parallel to the horizontal surface. In FIG. 4B, the grounding surface 400 of the shovel 1 is sloped by an angle '$\Psi$' with respect to the horizontal surface and a slope portion 410 is sloped by the angle '$\Psi$', compared to the slope portion 410 of FIG. 4A. A surface 420 is a surface parallel to the grounding surface 400. An angle $\theta$ formed by the surface 420 parallel to the grounding surface 400 of the shovel 1 and the slope portion 410 is the same between FIGS. 4A and 4B.

In FIG. 4A, a case in which a depth of a point A on the ground in which the grounding surface 400 of the shovel 1 is a reference is calculated will be described. A distance value Dp is a distance of the point P on the ground from the camera 11. The distance value Dp is included in the distance image acquired in step S301. A point Ps is an intersection of an extension line of the grounding surface 400 of the shovel 1 and a line formed from the point P and the camera 11. An angle $\phi$ is an angle formed by the extension line of the grounding surface 400 and the line binding the camera 11 and the point P on the ground and is determined with a direction and an installation position when the camera 11 is installed in the shovel 1. A distance Dps is a distance between the camera 11 and the point Ps. The distance Dps is uniquely obtained from the angle $\phi$. At this time, a distance Dd corresponding to the depth of the point P viewed from the grounding surface 400 of the shovel 1 is obtained with the following Expression (1).

$$Dd=(Dp-Dps)*\sin e(\varphi) \qquad (1)$$

The risk determination unit 241*b* calculates a depth viewed from the grounding surface 400 of the shovel 1 for all the pixels of the distance image by using Expression (1).

In S303, the risk determination unit 241*b* of the FPGA 241 calculates gradient information of the topography from the unevenness information of the topography. The gradient information of the topography is a relative slope angle of the slope portion 410 in which the grounding surface 400 of the shovel 1 is a reference. For example, in FIG. 4A, the gradient information of the topography is information corresponding to the angle θ in the slope portion 410 of the ground. The gradient information can be calculated easily through geometric calculation based on the unevenness information of the topography calculated in S302. The method of calculating the gradient information and the unevenness information of the topography is not limited thereto. For example, a method of generating a 3D model of the periphery of the shovel 1 using a known 3D model generation technology based on the distance image and then acquiring the gradient information in which the grounding surface of the shovel 1 in the 3D model is a reference may be used.

In S304, the risk determination unit 241*b* of the FPGA 241 acquires the slope information of the shovel 1 from the slope line 280 with respect to the shovel 1. The slope information can be handled as slope information of the grounding surface 400 of the shovel 1 with respect to the horizontal surface. For example, in FIG. 4A, since the grounding surface 400 is horizontal and an angle of the grounding surface 400 with respect to the horizontal surface is 0, a slope with respect to the horizontal surface in the slope information is 0. In FIG. 4B, slope information indicating that the grounding surface 400 is sloped by the angle 'Ψ' with respect to the horizontal surface can be obtained.

In S305, the risk determination unit 241*b* of the FPGA 241 corrects the gradient information of the topography in which the grounding surface 400 of the shovel 1 is a reference and which is calculated in step S303 to the gradient information of the topography in which the horizontal surface is a reference by using the slope information acquired in S304. In FIG. 4A, since the gradient information of the topography in which the grounding surface 400 of the shovel 1 is a reference and which is calculated in S303 is the angle θ and the slope information is 0, the gradient information of the topography in which the horizontal surface is a reference is calculated as the angle θ. On the other hand, in FIG. 4B, since the gradient information of the topography in which the grounding surface 400 of the shovel 1 and which is calculated in S303 is 0 and the slope information is the angle Ψ, the gradient information of the topography in which the horizontal surface is a reference is calculated as an angle θ+Ψ.

In S306, the risk determination unit 241*b* of the FPGA 241 determines a tumble risk in a case of inroad of the shovel 1 into each region in an imaging view angle of the cameras 11 to 14 based on the gradient information of the topography in which the horizontal surface is a reference and which is calculated in S305, and generate a tumble risk map. The risk determination unit 241*b* determines a tumble risk by comparing the gradient information of the topography in which the horizontal surface is a reference and a predetermined threshold. For example, a threshold for determining that a tumble risk is large is defined as TH1 and a threshold for determining that the tumble risk is intermediate is defined as TH2. The threshold TH2 is an angle less than the threshold TH1. At this time, the risk determination unit 241*b* determines that a tumble risk is small when gradient information of a surface is less than TH2, determines that the tumble risk is intermediate when the gradient information of the surface is greater than TH2, and determines that the tumble risk is large when the gradient information of the surface is greater than TH1.

For example, it is assumed that the thresholds TH1 and TH2 are values satisfying threshold TH2<θ+Ψ<threshold TH1. The risk determination unit 241*b* determines that the tumble risk is intermediate by comparing the tumble risk in the case of inroad of the shovel 1 into the slope portion 410 in the state of FIG. 4B with the gradient information θ+Ψ in which the horizontal surface of the slope portion 410 is a reference and the thresholds TH1 and TH2. Further, the threshold TH2 is assumed to satisfy Ψ<TH2. The risk determination unit 241*b* determines that the tumble risk is small by comparing the tumble risk in the case of movement of the shovel 1 to another region on the grounding surface 400 in the state of FIG. 4B with the threshold TH2 and the gradient information Ψ in which the horizontal surface of the grounding surface 400 is a reference.

The risk determination unit 241*b* may change the thresholds TH1 and TH2 in accordance with an operation status of the shovel 1. For example, the risk determination unit 241*b* changes the thresholds (the thresholds TH1 and TH2) in accordance with positional information of the arm 1*b* output from the arm position information acquisition unit 290. The change in the thresholds for determining the tumble risk in accordance with the positional information of the arm 1*b* will be described with reference to FIGS. 5A and 5B.

Figure 5A:
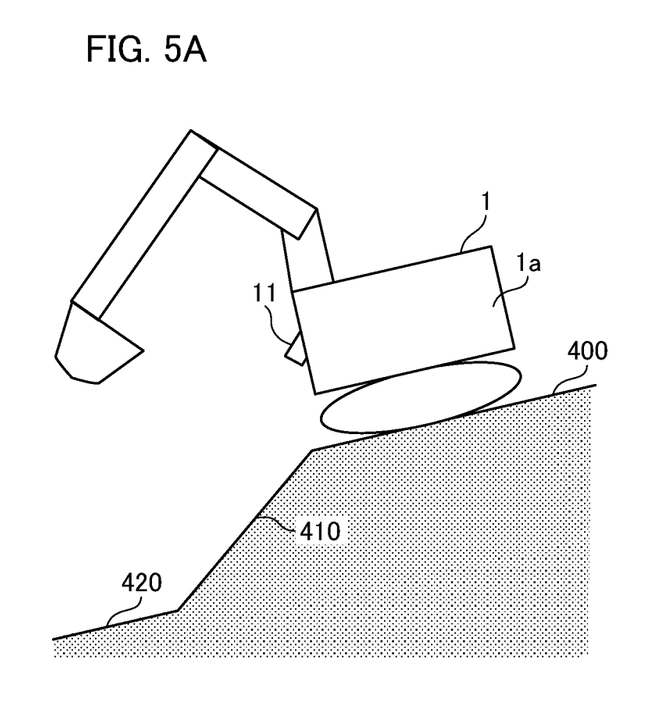
FIGS. 5A and 5B are diagrams illustrating a change in thresholds for determination of a tumble risk in accordance with positional information of an arm.

FIGS. 5A and 5B are diagrams illustrating a change in the thresholds for determination of a tumble risk in accordance with the positional information of the arm. FIG. 5A is a diagram illustrating a state in which the arm 1*b* is located in front of that in FIG. 4B (a farther side from the turning unit 1*a*). At this time, a center of gravity of the shovel 1 illustrated in FIG. 5A is on the left side in the drawing than the state of FIG. 4B, that is, the side of the slope portion 410 which is a descending slope surface. Therefore, a possibility of tumble of the shovel 1 in the case of inroad into the slope portion 410 in the state of FIG. 5A is higher than a possibility of tumble of the shovel 1 in the case of inroad into the slope portion 410 in the state of FIG. 4B. Thus, the risk determination unit 241*b* sets the thresholds so that the possibility of tumble in the case of movement of the shovel 1 to the slope portion 410 in the state of FIG. 5A is determine to be higher than a possibility of tumble in the case of movement of the shovel 1 to the slope portion 410 in the state of FIG. 4B. That is, the risk determination unit 241*b* causes the thresholds for determining the tumble risk in the state of FIG. 5A to be less than the thresholds for determining the tumble risk in the state of FIG. 4B.

Figure 5B:
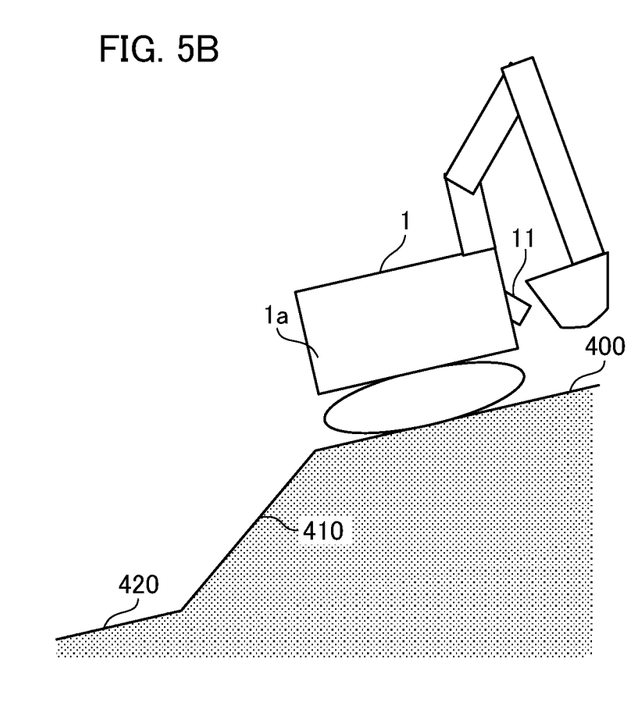

FIG. 5B illustrates a state in which the turning unit 1*a* of the shovel 1 turns by 180° from the state of FIG. 4B and the arm 1*b* becomes closer to the turning unit 1*a*. At this time, the center of gravity of the shovel 1 illustrated in FIG. 5B is on the right side in the drawing than in the state of FIG. 4B, that is, opposite to the slope portion 410 which is a descending slope surface. Therefore, a possibility of tumble of the shovel 1 in the case of inroad into the slope portion 410 in the state of FIG. 5B is lower than a possibility of tumble of the shovel 1 in the case of inroad into the slope portion 410 in the state of FIG. 4B. Thus, the risk determination unit 241*b* sets the thresholds so that the possibility of tumble of the shovel 1 in the case of movement into the slope portion 410 in the state of FIG. 5B is determined to be lower than a possibility of tumble in the case of movement of the shovel 1 into the slope portion 410 in the state of FIG. 4B. That is, the risk determination unit 241*b* causes the thresholds for determining the tumble risk in the state of FIG. 5B to be greater than the thresholds for determining the tumble risk in the state of FIG. 4B. In this way, the risk determination unit 241*b* can change the thresholds for determining the tumble risk in accordance with the position of the center of gravity of the shovel 1 based on the position of the arm 1*b* and can determine the tumble risk in accordance with the position of the center of gravity of the shovel 1.

In the embodiment, the example in which the thresholds for determining the tumble risk in accordance with the position of the arm 1*b* are changed has been described, but the present invention is not limited thereto. In addition to the position of the arm 1*b*, the thresholds for determining the tumble risk may be changed in accordance with an operation status in which the center of gravity of the shovel 1, such as whether there is an object loaded on a bucket or a weight of the object, is changed. The thresholds for determining the tumble risk may not be changed, but the gradient information of the topography in which the horizontal surface is a reference and which is calculated to compare with the thresholds may be corrected in accordance with the center of gravity of the shovel 1 based on a position of the arm 1*b* or the like. The process in which the risk determination unit 241*b* determines the tumble risk has been described above. The risk determination unit 241*b* performs the above-described process of determining the tumble risk on all the pixels of the distance image. Then, a tumble risk map in which determination results of the tumble risk in all the pixels are integrated is generated and stored in the buffer memory 242.

In S307, the display video generation unit 241*c* generates an image indicating the tumble risk. The display video generation unit 241*c* generates an image for reporting the tumble risk of a region in the periphery of the shovel 1 including a travel direction of the shovel 1 to an operator based on the tumble risk map generated in S306 and images acquired from the cameras 11 to 14. An example of a display image generation process by the display video generation unit 241*c* will be described with reference to FIG. 6.

Figure 6:
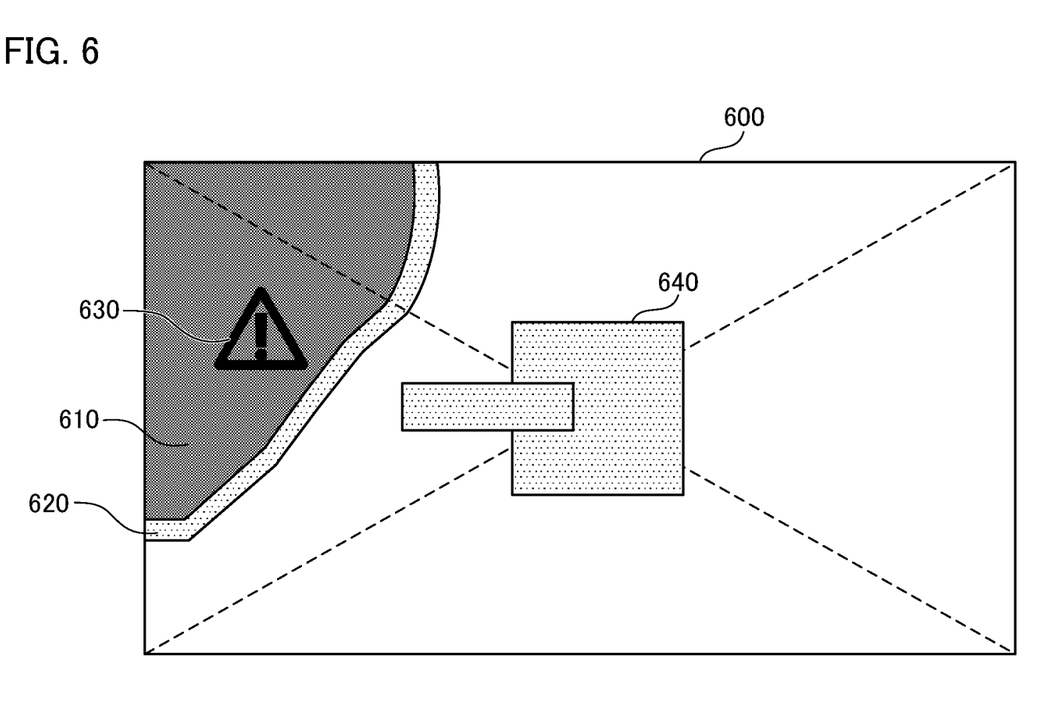
FIG. 6 is a diagram illustrating an example of an image indicating a tumble risk.

FIG. 6 is a diagram illustrating an example of an image indicating a tumble risk. An image indicating a stumble risk is, for example, an image in which a risk of stumble or fall is superimposed and displayed on a bird's-eye view indicating the periphery of the shovel 1 centering on the shovel 1. The bird's-eye view is a virtual viewpoint image (a virtual viewpoint video) obtained by converting the images acquired from the cameras 11 to 14 from the viewpoints. First, the display video generation unit 241*c* converts developed images acquired from the cameras 11 to 14 into virtual viewpoint images obtained by viewing the periphery of the shovel 1 from virtual viewpoints. The virtual viewpoints mean, for example, viewpoints at which the front is viewed in an upright direction of the shovel 1 or from the diagonal rear of the shovel 1. The virtual viewpoint image may be generated using a known scheme and is generated, for example, through a rendering process so that an image developed on any projection surface such as a sphere is projected and the sphere is viewed from a virtual viewpoint. Here, in description, it is assumed that the display video generation unit 241*c* combines developed images corresponding to the cameras 11 to 14 and generate a virtual viewpoint image viewed in a ground direction from an upright viewpoint of the shovel 1, as illustrated in a virtual viewpoint image 600 of FIG. 6. Dotted lines illustrated in FIG. 6 indicate combination boundaries of the developed images of the cameras 11 to 14 for convenience and are not necessarily included in the virtual viewpoint images.

Subsequently, the display video generation unit 241*c* generates a display image by superimposing information indicating the tumble risk based on the tumble risk map generated by the risk determination unit 241*b* on the virtual viewpoint image. Then, the display video generation unit 241*c* outputs the generated display image to the display unit 250 or the external communication unit 270. A region 610, a region 620, and a mark 630 are information indicating a tumble risk for warning an operator about a risk of tumbling the shovel 1. The region 610 is a region where the risk determination unit 241*b* determines that the tumble risk is high. The region 610 is shown with, for example, red. The region 610 is a region corresponding to the slope portion 410 in FIG. 4B. The slope portion 410 indicated by the region 610 is a slope surface unseen by the operator inside the shovel 1. The region 620 is a region where the risk determination unit 241*b* determines that the tumble risk is intermediate. The region 620 is shown with, for example, yellow. The region 620 is a region corresponding to a boundary between the grounding surface 400 and the slope portion 410 in FIG. 4B. The mark 630 is a mark for highlighting the region 610 with the high tumble risk. In a region where the risk determination unit 241*b* determines that the tumble risk is low, information indicating the tumble risk is not superimposed or displayed.

The form in which the tumble risk is shown with two colors has been described, but a form in which the tumble risk is displayed in an image is not limited thereto. For example, the tumble risk may be expressed with a gradation change in color step by step or blinking display or the like may be combined. The display video generation unit 241*c* may not normally superimpose information indicating the tumble risk on the virtual viewpoint image 600 or may repeat superimposition or non-superimposition, for example, at each predetermined time. The display video generation unit 241*c* may superimpose a CG image 640 in which the shovel 1 is viewed from the virtual viewpoint on the virtual viewpoint image 600.

The example in which a developed image is projected to any projection surface such as a sphere and the rendering process is performed so that the sphere is seen from the virtual viewpoint in the generation of the virtual viewpoint image 600 has been described, but the present invention is not limited thereto. A projection surface to which the developed image is projected may be the 3D model generated by the risk determination unit 241*b* based on the distance image in the procedure described in S303. When a projection surface made based on the distance image of the periphery of the shovel 1 is used, distortion of a 3-dimensional object located on the ground or in the periphery of the shovel 1 can be further reduced than a virtual viewpoint image generated using any projection surface such as a sphere. Therefore, the operator of the shovel 1 can determine a region with a high tumble risk more accurately.

The example in which the information indicating the tumble risk is superimposed and displayed on the virtual viewpoint image 600 which is a bird's-eye view has been described, but the present invention is not limited thereto. For example, the information indicating the tumble risk may be superimposed on a corresponding region of each image in a form in which the images acquired from the cameras 11 to 14 are arranged in one row or a 2×2 matrix shape.

In S308, the display video generation unit 241*c* transmits the display image generated in S307 to the display unit 250 or the external communication unit 270. For example, when the operator riding the shovel 1 is operating the shovel 1, the display video generation unit 241c outputs the display image to only the display unit 250. On the other hand, when the shovel 1 is remotely operated, the display video generation unit 241c outputs the display image to the external communication unit 270. Even when the operator riding the shovel 1 is operating the shovel 1, the display image may be output to the external communication unit 270 in addition to the display unit 250 so that a field supervisor may confirm the display image. The display image is displayed to an output destination and the operator of the shovel 1 can perform an operation while confirming the display image.

Figure 7:
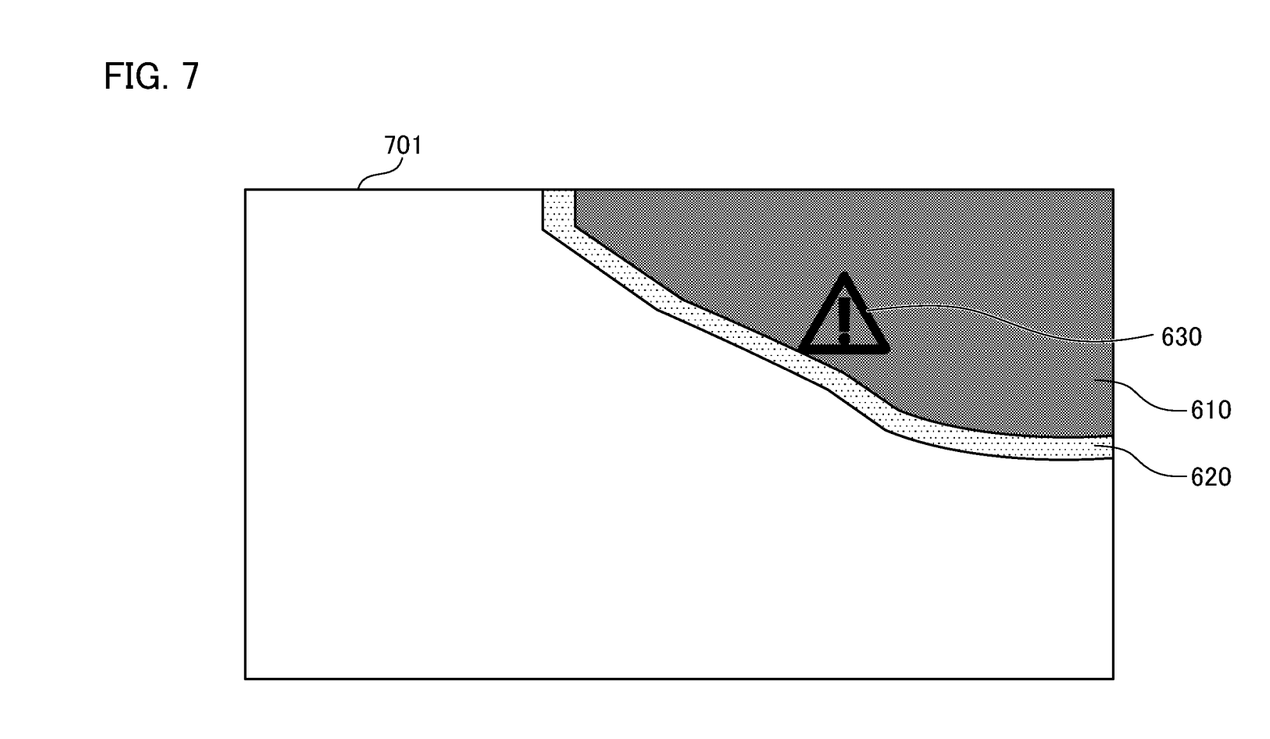
FIG. 7 is a diagram illustrating an example of an image indicating a tumble risk in a travel direction.

In the embodiment, the risk determination unit 241b determines the risk of all the pixels and the display video generation unit 241c generates the display image in all the directions centering on the shovel 1 indicating the tumble risk, as described above. However, only the travel direction may be targeted. First, the risk determination unit 241b acquires information regarding the travel direction of the shovel 1 from the travel control unit 260. Subsequently, when information indicating that the shovel 1 is advancing is acquired, the risk determination unit 241b generates the tumble risk map in only the traveling direction (the front side) of the shovel 1. As illustrated in FIG. 7, the display video generation unit 241c generates an image 701 in which a tumble risk is shown in the travel direction (the front side) of the shovel 1. FIG. 7 is a diagram illustrating an example of an image indicating the tumble risk in the travel direction. The display video generation unit 241c outputs the image indicating the tumble risk in the travel direction to the display unit 250 or the external communication unit 270. A driver of the shovel 1 easily ascertains the tumble risk in the travel direction by confirming the image indicating the tumble risk in the travel direction. Even when the tumble risk is indicated in the virtual viewpoint image illustrated in FIG. 6, the tumble risk in the travel direction of the shovel 1 may be highlighted and displayed with color that has higher saturation than that of tumble risks in other directions based on the information regarding the travel direction of the shovel 1 acquired from the travel control unit 260.

In the embodiment, the example in which the distance image is generated using a pair of image signals with different parallaxes output from the image sensor 221b to 224b of an image surface phase difference scheme and the topography of the periphery of the shovel 1 is ascertained has been described, but the present invention is not limited thereto. For example, the distance information of the periphery of the shovel 1 may be acquired using a stereo camera as a distance sensor. The distance information of the periphery of the shovel 1 may be acquired from output information of a distance sensor such as a light detection and ranging (LiDAR). When the distance information of the periphery of the shovel 1 is acquired from a distance sensor measuring a distance, the cameras 11 to 14 are not necessary. Even when the cameras 11 to 14 are not provided, the display video generation unit 241c can convert distance information obtained from the distance sensor into a so-called point group image indicating a distance for each color to form an image and generate a display image by superimposing the information indicating the tumble risk on the point group image.

In the embodiment, the shovel has been described as an example of a mobile object, but the present invention is not limited thereto. For example, another working equipment such as a bulldozer or a crane may be used or a passenger car or a truck may be used. The embodiment is appropriate for a vehicle of which a center of gravity is biased, such as an apparatus that has an arm.

In this way, according to the embodiment, a tumble risk of a mobile object can be determined in consideration of a slope of the mobile object itself on a slope land. Therefore, it is possible to provide a monitoring system capable of determining a tumble risk of a mobile object on a slope land with high accuracy.

Other Embodiments

An embodiment of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment and/or that includes one or more circuits (e.g., application specific integrated circuit (ASIC)) for performing the functions of one or more of the above-described embodiment, and by a method performed by the computer of the system or apparatus by, for example, reading out and executing the computer executable instructions from the storage medium to perform the functions of one or more of the above-described embodiment and/or controlling the one or more circuits to perform the functions of one or more of the above-described embodiment. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-080656, filed May 17, 2022, which is hereby incorporated by reference wherein in its entirety.

What is claimed is:

1. A monitoring system that monitors a periphery of a mobile object moving on ground and reports a tumble risk of the periphery of the mobile object to an operator, the monitoring system comprising:
 a memory storing instructions; and
 a processor executing the instructions causing the monitoring system to:
  determine a tumble risk in a case of movement of the mobile object to the periphery based on distance information measured by a first sensor that is mounted on the mobile object and measures a distance to a ground object including the ground in the periphery of the mobile object and slope information measured by a second sensor measuring a slope of the mobile object; and
  generate and output an image indicating the tumble risk, wherein the first sensor is an imaging device mounted on the mobile object and configured to image the periphery of the mobile object, wherein the processor generates the image in which information indicating the tumble risk is superimposed on an image captured by the imaging device or a virtual viewpoint image obtained by converting a viewpoint of the image, wherein the imaging device includes an image sensor that receives light fluxes passing through different pupil regions of an imaging optical system and outputs a plurality of images, and wherein the distance information is acquired from the plurality of images captured by the image sensor.

2. The monitoring system according to claim 1, wherein the processor calculates gradient information of topography of a horizontal surface reference by calculating a relative slope angle of the ground for which a grounding surface of the mobile object is a reference from the distance information and correcting the slope angle based on the slope information, and determines the tumble risk by comparing the gradient information with a threshold.

3. The monitoring system according to claim 1, wherein the processor determines the tumble risk based on the distance information and the slope information, and a center of gravity of the mobile object in accordance with an operation situation of the mobile object.

4. The monitoring system according to claim 1, wherein the processor generates the image in which the information indicating the tumble risk is superimposed and in which the distance information is imaged.

5. The monitoring system according to claim 1, wherein the virtual viewpoint image is a bird's-eye image that has a bird's-eye view of the mobile object and the periphery of the mobile object.

6. The monitoring system according to claim 1,
wherein the imaging device is a stereo camera, and
wherein the distance information is acquired from an image captured by the stereo camera.

7. The monitoring system according to claim 1, wherein the processor generates the image indicating the tumble risk according to a travel direction of the mobile object.

8. The monitoring system according to claim 1, wherein the processor outputs the image indicating the generated tumble risk to a display device provided in the mobile object or an external device.

9. A method of controlling a monitoring system that monitors a periphery of a mobile object moving on ground and reports a tumble risk of the periphery of the mobile object to an operator, the method comprising:

determining a tumble risk in a case of movement of the mobile object to the periphery based on distance information measured by a first sensor that is mounted on the mobile object and measures a distance to a ground object including the ground in the periphery of the mobile object and slope information measured by a second sensor measuring a slope of the mobile object;

generating an image indicating the tumble risk; and outputting the generated image, wherein the first sensor is an imaging device mounted on the mobile object and configured to image the periphery of the mobile object, wherein the processor generates the image in which information indicating the tumble risk is superimposed on an image captured by the imaging device or a virtual viewpoint image obtained by converting a viewpoint of the image, wherein the imaging device includes an image sensor that receives light fluxes passing through different pupil regions of an imaging optical system and outputs a plurality of images, and wherein the distance information is acquired from the plurality of images captured by the image sensor.

10. A non-transitory storage medium storing a control program of a monitoring system that monitors a periphery of a mobile object moving on ground and reports a tumble risk of the periphery of the mobile object to an operator, and causing a computer to perform each step of a control method for the monitoring system, the control method comprising:

determining a tumble risk in a case of movement of the mobile object to the periphery based on distance information measured by a first sensor that is mounted on the mobile object and measures a distance to a ground object including the ground in the periphery of the mobile object and slope information measured by a second sensor measuring a slope of the mobile object;

generating an image indicating the tumble risk; and outputting the generated image, wherein the first sensor is an imaging device mounted on the mobile object and configured to image the periphery of the mobile object, wherein the processor generates the image in which information indicating the tumble risk is superimposed on an image captured by the imaging device or a virtual viewpoint image obtained by converting a viewpoint of the image, wherein the imaging device includes an image sensor that receives light fluxes passing through different pupil regions of an imaging optical system and outputs a plurality of images, and wherein the distance information is acquired from the plurality of images captured by the image sensor.

* * * * *